United States Patent [19]
de la Guardia et al.

[11] Patent Number: 4,567,521
[45] Date of Patent: Jan. 28, 1986

[54] PROCESSOR CONTROLLED DIGITAL VIDEO SYNC GENERATION

[75] Inventors: Mario de la Guardia; Ming-Luh Kao, both of Miami, Fla.

[73] Assignee: Racal Data Communications Inc., Miami, Fla.

[21] Appl. No.: 509,173

[22] Filed: Jun. 28, 1983

[51] Int. Cl.⁴ .............................................. H04N 5/06
[52] U.S. Cl. .................................... 358/150; 358/151
[58] Field of Search ............... 358/148, 150, 151, 160, 358/319, 320, 337, 339

[56] References Cited

U.S. PATENT DOCUMENTS

| 4,148,070 | 4/1979 | Taylor | 358/160 |
| 4,386,368 | 5/1983 | Banks | 358/150 |
| 4,396,938 | 8/1983 | Dischert | 358/160 |
| 4,400,717 | 8/1983 | Southworth et al. | 358/13 |
| 4,400,733 | 8/1983 | Yost | 358/155 |
| 4,403,250 | 9/1983 | Kellar | 358/105 |
| 4,405,945 | 9/1983 | Sato | 358/154 |
| 4,412,250 | 10/1983 | Smith | 358/150 |

Primary Examiner—Michael A. Masinick
Assistant Examiner—Michael D. Parker
Attorney, Agent, or Firm—Jerry A. Miller; William A. Newton

[57] ABSTRACT

A microprocessor-based video sync generation technique wherein the microprocessor stores a table of transition times and at each time supplies appropriate control signals to a digital-to-analog converter to cause it to generate the desired sync waveform.

5 Claims, 5 Drawing Figures

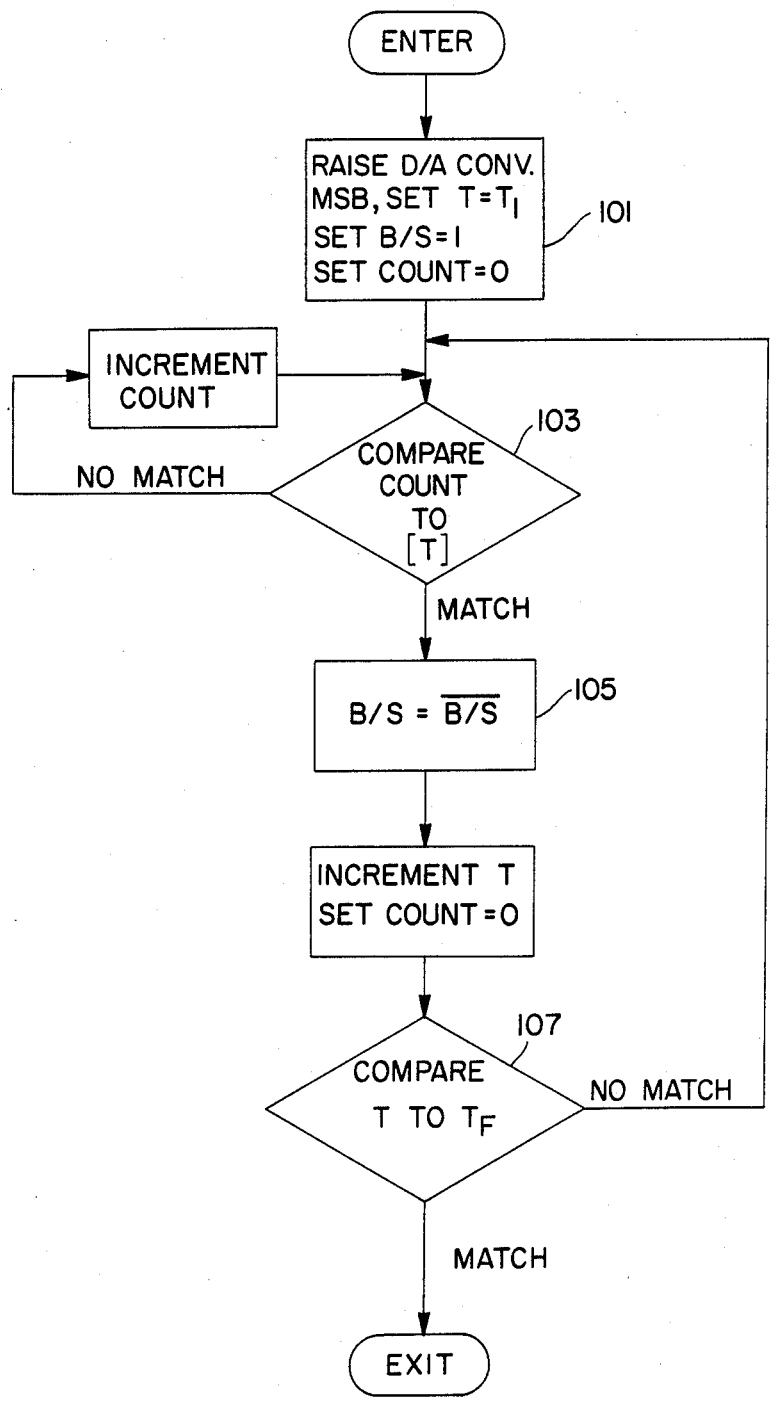

PROCESSOR CONTROLLED DIGITAL VIDEO SYNC GENERATION

BACKGROUND OF THE INVENTION

The subject invention relates to improvements in video processing systems. The subject invention finds particular application in a slow scan digital video processor utilizing microprocessor techniques.

Prior art video signal processing systems for converting a video signal to digital format and storing frames of digital data are known. See U.S. Pat. No. 4,148,070. Such video processors have typically used analog or a combination of analog and digital techniques to detect and regenerate sync signals required by the video format. It has appeared desirable to the inventors to devise a technique whereby the sync generation functions can be accomplished in a microprocessor environment, avoiding as many analog functions as possible. The subject invention provides such a technique.

SUMMARY OF THE INVENTION

It is therefore an object of the invention to provide a digital video sync generation technique for use with a microprocessor-based frame storage and transmission system.

Further objects and advantages of the will be apparent to those skilled in the art from the description which follows.

In accordance with the invention, to synthesize a video sync signal, a microprocessor supplies a control signal at predetermined times which indicates that one of two levels (black or blacker-than-black) of a video sync signal is to be produced. The control signal causes one of two codes to be supplied to a digital-to-analog converter, which in turn causes the converter to generate one of two levels. The duration of the levels is controlled by the duration during which the microprocessor maintains the control signal at a particular value. An additional control signal supplied by the processor causes the digital-to-analog converter to place the two-level signal in the proper voltage range to replicate a viedo sync signal.

BRIEF DESCRIPTION OF THE DRAWINGS

FIG. 5 is a flow chart illustrating the video sync generation technique.

DETAILED DESCRIPTION OF THE PREFERRED EMBODIMENT

Figure 1:
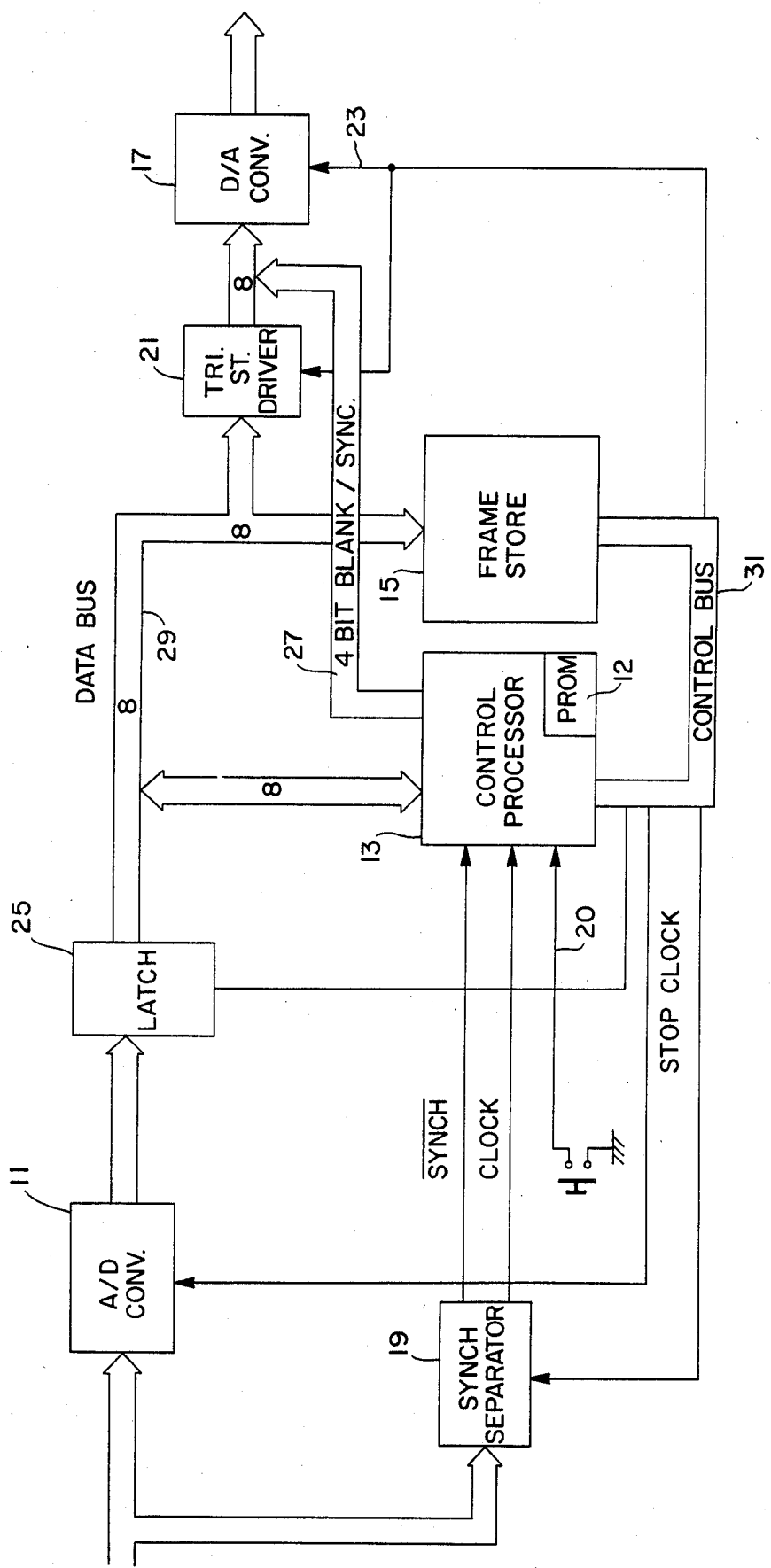
FIG. 1 illustrates a typical digital processor-based video processor wherein the subject invention finds use.

A digital video processor is shown in FIG. 1. It includes an A/D converter 11, a programmed control processor 13, a frame store 15 and a D/A converter 17. The preferred processor 13 is a microprocessor having a microinstruction execution time (referred to hereafter as "cycle" time) of 217 nanoseconds. Such a microprocessor is preferably configured from the commercially available 2900 series logic.

In the circuitry of FIG. 1, operation is initiated by a "freeze" signal applied manually or automatically to the processor over a line 20. A frame of analog video signal, such as from a TV camera, is converted to digital information by the A/D 11, passed through a latch 25, and stored in the frame store 15 by the control processor 13. The A/D 11 is clocked and controlled over a control line 14, while the latch 25 is controlled over a line 16. The frame store 15 is controlled by the processor 13 over a control bus 31, which supplies control signals including a number of address bits, preferably stored by an incrementable address register in the control processor 31.

The TV picture in the frame store 15 actually contains 256 lines each having 256 points. Each point is represented by a digital number. The TV picture tube successively scans these points and controls their color as instructed by the digital number to form the composite picture. To control the scanning, vertical and horizontal sync pulses are used. The vertical sync brings the scanner (the "spot") to the upper left corner of the TV picture. The scanner then employes the output of the frame store 15 to scan the first line. At the end of the first line the scanner receives a horizontal sync signal which causes the scanner to drop to the next line.

Figure 2:
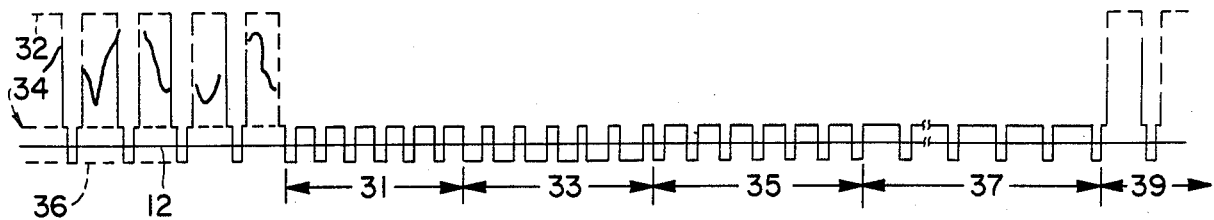
FIG. 2 illustrates a standard format video signal.

A standard format video signal is shown in FIG. 2. This signal transits through levels known as "white" 32, "black" 34 and "blacker than black" 36. The video signal successively includes (1) an equalizing pulse train 31, (2) a vertical sync pulse train 33, (3) a second equalizing pulse train 35, (4) a horizontal sync pulse train 37, (5) alternating analog video and horizontal sync pulses 39. The time interval between the last horizontal sync pulse and the beginning of the equalizing pulse train of the vertical sync pattern is "H" (63.5 $\mu$s) for Field 1 and 0.5H (31.7 $\mu$s) for Field 2.

When it is desired to output a frame stored by frame store 15 for display or transmission, it is necessary to regenerate the sync signal pattern. In the preferred embodiment, this is done by storing times corresponding to the transitions between the black and blacker-than-black level, and a control bit indicating whether the desired level to be generated is or is not blacker-than-black. The transition times and control bit are preferably stored in a programmable read-only memory (PROM) 12. Thus, the regeneration of proper sync signals is table-driven. The derivation of a proper table to replicate the sync train of FIG. 2 according to the method and apparatus disclosed hereafter is well within the skill of those skilled in the art.

With respect to FIG. 1, the processor 13 cooperates with the D/A converter 17 to generate the proper sync train in accordance with the information stored in the PROM 12. The D/A converter 17 has nine input bits. Eight of these are typically video inputs supplied via a three-state driver 21. The ninth and most significant bit (MSB) 23 is controlled by the processor 13.

Figure 4:
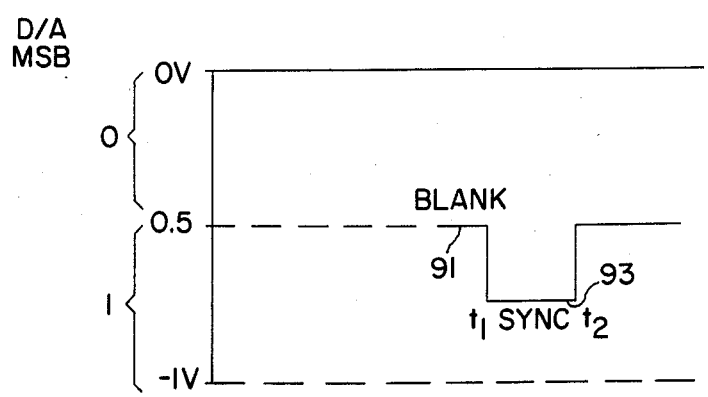
FIG. 4 illustrates operation of the D/A converter of the preferred embodiment.

As shown in FIG. 4, the D/A 17 maps the input digital signal into a zero to negative one volt range. It the MSB 23 is zero, the other eight input bits are mapped into the zero to negative five-tenths of a volt range. A suitable D/A converter 17 is P/N TDC 1016J-9 as manufactured by TRW.

In operation, when a pulse train such as that of FIG. 2 is to be generated, the processor 13 raises the MSB input to the D/A 17 to a logical one, which disables the tri-state device 21. The input to the D/A 17 now is supplied by four bits on the blank/sync bus 27. These four bits are either all zeros or 0111, depending on whether the processor control bit indicates a blank ("black" level) or a sync pulse ("blacker-than-black" level) is to be produced.

With the MSB 23 at "one" and a blank level control signal present, a blank level 91 is produced at the negative five-tenths of a volt level shown in FIG. 4. When an interval-counter in the processor 13 matches a stored count value $t_1$ (FIG. 4), the blank/sync control signal supplies the proper four bit combination to generate the sync pulse level 93. Upon the next interval-counter match $t_2$ the blank/sync control is switched, returning the pusle train to the blank level.

Figure 3:
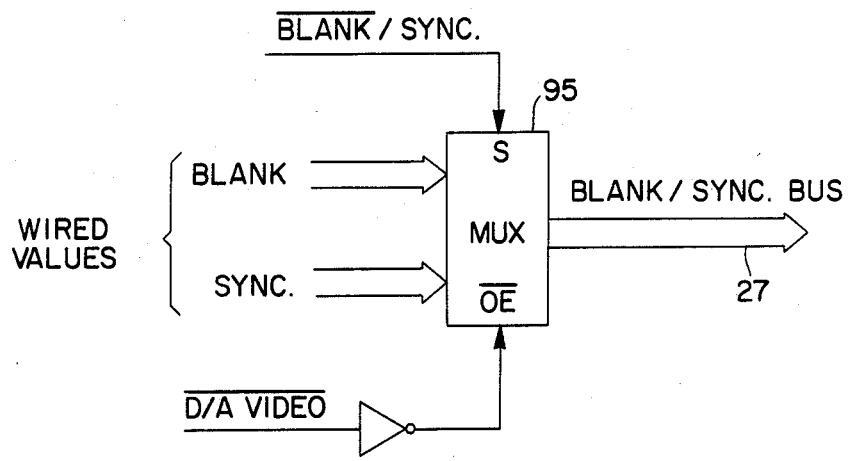
FIG. 3 illustrates apparatus for controlling the blank/sync bus of the preferred embodiment.

Use of the blank/sync control bit is further illustrated in FIG. 3. As shown there, the respective blank and sync bit combinations are hardwired to a multiplexer 95. The multiplexer 95 is switched by the blank/sync line from the processor 13 to gate the correct blank or sync bit combination to the D/A 17. The mux 95 is disabled during normal video transmission. It may be noted that an analog switch could be controlled by the processor in lieu of a D/A converter.

FIG. 5 illustrates the flow of operation of the processor 13 in sync generation. At block 101, the processor 13 establishes initial conditions by raising the MSB to the D/A converter 17 and setting the B/S control bit. A processor counter is set to zero and an initial address T1 established.

At test 103, the current count value is compared to [T], the value stored at address T1 of the processor memory. If there is no match the count value is incremented and the test 103 is performed again. When sufficient time has elapsed, the count value will equal [T], and test 103 will then be satisfied.

When test 103 is satisfied, the processor 13 switches or inverts the value of B/S (block 105), thereby changing the level of the signal under generation. The processor 13 also increments T to the next address T2 and resets the count to zero.

At test 107, [T] is compared to $T_F$, the ending address. If there is no match, the processor 13 returns to the entry point of test 103, to generate the next level change. In this manner, the entire sync pattern of FIG. 2 may be generated.

Many modifications and adaptations of the above described preferred embodiment will be apparent to those skilled in the art from the above disclosure. Therefore, it is to be understood that, within the scope of the appended claims, the invention may be practiced other than as specifically described above.

What is claimed is:

1. A method of synchronizing a signal for video applications comprising the steps of:

storing a table in digital form of times corresponding to transitions between black and blacker-than-black levels in a desired sync signal;
generating an interval count in an interval counter;
comparing said interval count to the times stored in said table;
producing an output signal at the black level and changing the level of that output signal to a blacker-than-black level when a match occurs between the count of said interval counter and one of said stored transition times.

2. The method of claim 1 wherein:

said output signal is provided by a digital-to-analog converter, said digital-to-analog converter providing said output in response to a plurality of input bits; and,
wherein said step of changing the level of the output signal comprises controlling at least one of the input bits to said digital-to-analog converter.

3. In a digital video processor, an apparatus for generating an output sync pulse train comprising:

a digital-to-analog converter means; and
means for controlling said converter means to produce said output sync pulse train; wherein said controlling means comprises:
storage means for storing transition times corresponding to transitions between black and blacker-than-black levels in a desired sync signal,
counting means for counting time intervals,
comparing means for comparing the counted intervals to said stored times in order to detect a match between one of said counted time intervals and one of said stored transition times; and
means for producing control signals to said digital-to-analog converter means upon detection of said match between one of said counted time intervals and one of said stored transition times.

4. The apparatus of claim 3 wherein said controlling means produces a mapping control bit and a blank/sync control bit, and further including means responsive to the blank/sync control bit for supplying said bits to said ditigal-to-analog converter, and wherein said digital-to-analog converter means is responsive to said mapping control bit to map the digital input of said converter means into an analog output range selected to represent a blank or sync level, and wherein said converter means further responds to said bits to produce said blank level and to produce said sync level.

5. The apparatus of claim 4 wherein said blank/sync bit is produced upon detection of said match by said comparing means.

* * * * *